US012165284B2

(12) United States Patent
Zhang et al.

(10) Patent No.: US 12,165,284 B2
(45) Date of Patent: *Dec. 10, 2024

(54) HARMONIZING COMPOSITE IMAGES UTILIZING A TRANSFORMER NEURAL NETWORK

(71) Applicant: Adobe Inc., San Jose, CA (US)

(72) Inventors: He Zhang, San Jose, CA (US); Jianming Zhang, Campbell, CA (US); Jose Ignacio Echevarria Vallespi, South San Francisco, CA (US); Kalyan Sunkavalli, San Jose, CA (US); Meredith Payne Stotzner, San Jose, CA (US); Yinglan Ma, Mountain View, CA (US); Zhe Lin, Fremont, CA (US); Elya Shechtman, Seattle, WA (US); Frederick Mandia, San Jose, CA (US)

(73) Assignee: Adobe Inc., San Jose, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 17/655,663

(22) Filed: Mar. 21, 2022

(65) Prior Publication Data

US 2023/0298148 A1 Sep. 21, 2023

(51) Int. Cl.
*G06V 10/00* (2022.01)
*G06T 5/50* (2006.01)
(Continued)

(52) U.S. Cl.
CPC ............... *G06T 5/50* (2013.01); *G06T 7/194* (2017.01); *G06T 7/90* (2017.01); *G06T 11/001* (2013.01);
(Continued)

(58) Field of Classification Search
CPC G06N 3/02; G06N 3/08; G06N 3/042; G06N 3/045; G06N 3/047; G06N 3/082;
(Continued)

(56) References Cited

U.S. PATENT DOCUMENTS 10,186,038 B1 * 1/2019 Kluckner .................. G06T 7/70
10,719,742 B2 * 7/2020 Shechtman ............ G06N 3/088
(Continued)

OTHER PUBLICATIONS

Wenyan Cong, Li Niu, Jianfu Zhang, Jing Liang, and Liqing Zhang. Bargainnet: Background-guided domain translation for image harmonization. In 2021 IEEE International Conference on Multimedia and Expo (ICME), pp. 1-6. IEEE, 2021.
(Continued)

*Primary Examiner* — Amir Alavi
(74) *Attorney, Agent, or Firm* — Keller Preece PLLC

(57) ABSTRACT

The present disclosure relates to systems, non-transitory computer-readable media, and methods that implement a dual-branched neural network architecture to harmonize composite images. For example, in one or more implementations, the transformer-based harmonization system uses a convolutional branch and a transformer branch to generate a harmonized composite image based on an input composite image and a corresponding segmentation mask. More particularly, the convolutional branch comprises a series of convolutional neural network layers followed by a style normalization layer to extract localized information from the input composite image. Further, the transformer branch comprises a series of transformer neural network layers to extract global information based on different resolutions of the input composite image. Utilizing a decoder, the transformer-based harmonization system combines the local information and the global information from the corresponding convolutional branch and transformer branch to generate a harmonized composite image.

20 Claims, 11 Drawing Sheets

(51) Int. Cl.
*G06T 7/194* (2017.01)
*G06T 7/90* (2017.01)
*G06T 11/00* (2006.01)

(52) U.S. Cl.
CPC  *G06T 2200/24* (2013.01); *G06T 2207/20016* (2013.01); *G06T 2207/20081* (2013.01); *G06T 2207/20084* (2013.01); *G06T 2207/20092* (2013.01); *G06T 2207/20212* (2013.01); *G06T 2207/30168* (2013.01)

(58) Field of Classification Search
CPC ...... G06N 3/092; G06N 3/088; G06N 3/0454; G06N 3/0464; G06N 3/0475; G06N 20/00; G06N 20/10; G06N 20/20; G06T 3/4046; G06T 9/002; G06T 5/50; G06T 7/194; G06T 7/90; G06T 2200/24; G06T 11/001; G06T 2207/20016; G06T 2207/20081; G06T 2207/20084; G06T 2207/30168; G06T 2207/20092; G06T 2207/20212

See application file for complete search history.

(56) References Cited

U.S. PATENT DOCUMENTS

| | | | | |
|---|---|---|---|---|
| 10,867,416 | B2* | 12/2020 | Shen | G06T 11/00 |
| 11,205,073 | B2* | 12/2021 | Hartman | G06T 7/248 |
| 11,869,125 | B2* | 1/2024 | Bedi | G06T 11/60 |
| 11,875,510 | B2* | 1/2024 | Wang | G06T 7/11 |
| 11,935,217 | B2* | 3/2024 | Zhang | G06N 3/08 |
| 2004/0077393 | A1* | 4/2004 | Kim | A63F 13/837 463/2 |
| 2018/0260668 | A1* | 9/2018 | Shen | G06V 10/82 |
| 2021/0335480 | A1* | 10/2021 | Johnsson | G06T 15/08 |
| 2023/0298148 | A1* | 9/2023 | Zhang | G06T 7/90 382/156 |
| 2024/0161240 | A1* | 5/2024 | Zhang | G06V 10/44 |

OTHER PUBLICATIONS

Wenyan Cong, Jianfu Zhang, Li Niu, Liu Liu, Zhixin Ling, Weiyuan Li, and Liqing Zhang. Dovenet: Deep image harmonization via domain verification. In Proceedings of the IEEE/CVF Conference on Computer Vision and Pattern Recognition, pp. 8394-8403, 2020.

Xiaodong Cun and Chi-Man Pun. Improving the harmony of the composite image by spatial-separated attention module. IEEE Transactions on Image Processing, 29:4759-4771, 2020.

Zonghui Guo, Haiyong Zheng, Yufeng Jiang, Zhaorui Gu, and Bing Zheng. Intrinsic image harmonization. In Proceedings of the IEEE/CVF Conference on Computer Vision and Pattern Recognition, pp. 16367-16376, 2021.

Yifan Jiang, He Zhang, Jianming Zhang, Yilin Wang, Zhe Lin, Kalyan Sunkavalli, Simon Chen, Sohrab Amirgh-odsi, Sarah Kong, and Zhangyang Wang. Ssh: A self-supervised framework for image harmonization. arXiv preprint arXiv:2108.06805, 2021.

Jun Ling, Han Xue, Li Song, Rong Xie, and Xiao Gu. Region-aware adaptive instance normalization for image har-monization. In Proceedings of the IEEE/CVF Conference on Computer Vision and Pattern Recognition, pp. 9361-9370, 2021.

Patrick Perez, Michel Gangnet, and Andrew Blake. Poisson image editing. In ACM SIGGRAPH 2003 Papers, pp. 313-318. 2003.

Erik Reinhard, Michael Adhikhmin, Bruce Gooch, and Peter Shirley. Color transfer between images. IEEE Computer graphics and applications, 21(5):34-41, 2001.

Michael W Tao, Micah K Johnson, and Sylvain Paris. Error-tolerant image compositing. In European Conference on Computer Vision, pp. 31-44. Springer, 2010.

Yi-Hsuan Tsai, Xiaohui Shen, Zhe Lin, Kalyan Sunkavalli,Xin Lu, and Ming-Hsuan Yang. Deep image harmonization. In Proceedings of the IEEE Conference on Computer Vision and Pattern Recognition, pp. 3789-3797, 2017.

Jun-Yan Zhu, Philipp Krahenbuhl, Eli Shechtman, and Alexei A Efros. Learning a discriminative model for the perception of realism in composite images. In Proceedings of the IEEE International Conference on Computer Vision, pp. 3943-3951, 2015.

Cun, Xiaodong, and Chi-Man Pun. "Improving the harmony of the composite image by spatial-separated attention module." IEEE Transactions on Image Processing 29 (2020): 4759-4771.

Guo, Zonghui, et al. "Transformer for image harmonization and beyond." IEEE transactions on pattern analysis and machine intelligence 45.11 (2022): 12960-12977. (Year: 2022).

Li, Boyi, et al. "Language-driven semantic segmentation." arXiv preprint arXiv:2201.03546 (2022).

Lin, Chen-Hsuan, et al. "ST-GAN: Spatial transformer generative adversarial networks for image compositing." Proceedings of the IEEE conference on computer vision and pattern recognition. 2018.

Ling, Jun, et al. "Region-aware adaptive instance normalization for image harmonization." Proceedings of the IEEE/CVF conference on computer vision and pattern recognition. 2021.

Niu, Li, et al. "Making images real again: A comprehensive survey on deep image composition." arXiv preprint arXiv:2106.14490 (2021).

Niu, Li, et al. "Making images real again: A comprehensive survey on deep image composition." arXiv preprint arXiv:2106.14490 (2024).

Sofiiuk, Konstantin, Polina Popenova, and Anton Konushin. "Foreground-aware semantic representations for image harmonization."Proceedings of the I EEE/CVF winter conference on applications of computer vision. 2021.

Tsai, Yi-Hsuan, et al. "Deep image harmonization." Proceedings of the IEEE conference on computer vision and pattern recognition. 2017.

* cited by examiner

HARMONIZING COMPOSITE IMAGES UTILIZING A TRANSFORMER NEURAL NETWORK

BACKGROUND

Recent years have seen significant advancement in hardware and software platforms for generating and editing composite images. For example, conventional image compositing systems identify a select region of an image to cut and combine with the background of another image. Subsequently, some conventional image compositing systems perform image harmonization to ensure the composite image looks realistic in terms of appearance (e.g., that a newly added foreground object aesthetically meshes with the background). To do so, conventional image compositing systems blend or match characteristics of the foreground and background portions of the composite image. For example, conventional image compositing systems perform image harmonization by matching one or more of color, luminescence, saturation, temperature, or lighting conditions between the foreground and background portions of the composite image. Unfortunately, a number of problems plague such image harmonization performed by conventional image compositing systems.

BRIEF SUMMARY

Embodiments of the present disclosure provide benefits and/or solve one or more of problems in the art with systems, non-transitory computer-readable media, and methods for utilizing a dual-branched harmonization framework to generate harmonized composite images. Specifically, the disclosed systems implement a combined CNN-transformer image harmonization framework for extracting both local and global information from a composite image. To illustrate, the disclosed systems use a convolutional neural network to capture the localized image context of the surrounding background near the composited foreground. In addition, the disclosed systems use a transformer neural network for modeling long-range context dependencies on a more global image scale of the composite image. In certain embodiments, the disclosed systems also utilize a style normalization layer to capture the visual style or color information from the background image and inject the captured information into the composited foreground. In one or more embodiments, the disclosed systems implement an iterative approach to enable better interpolation capability and provide greater flexibility to generate harmonization results from very diverse change to very mild changes.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
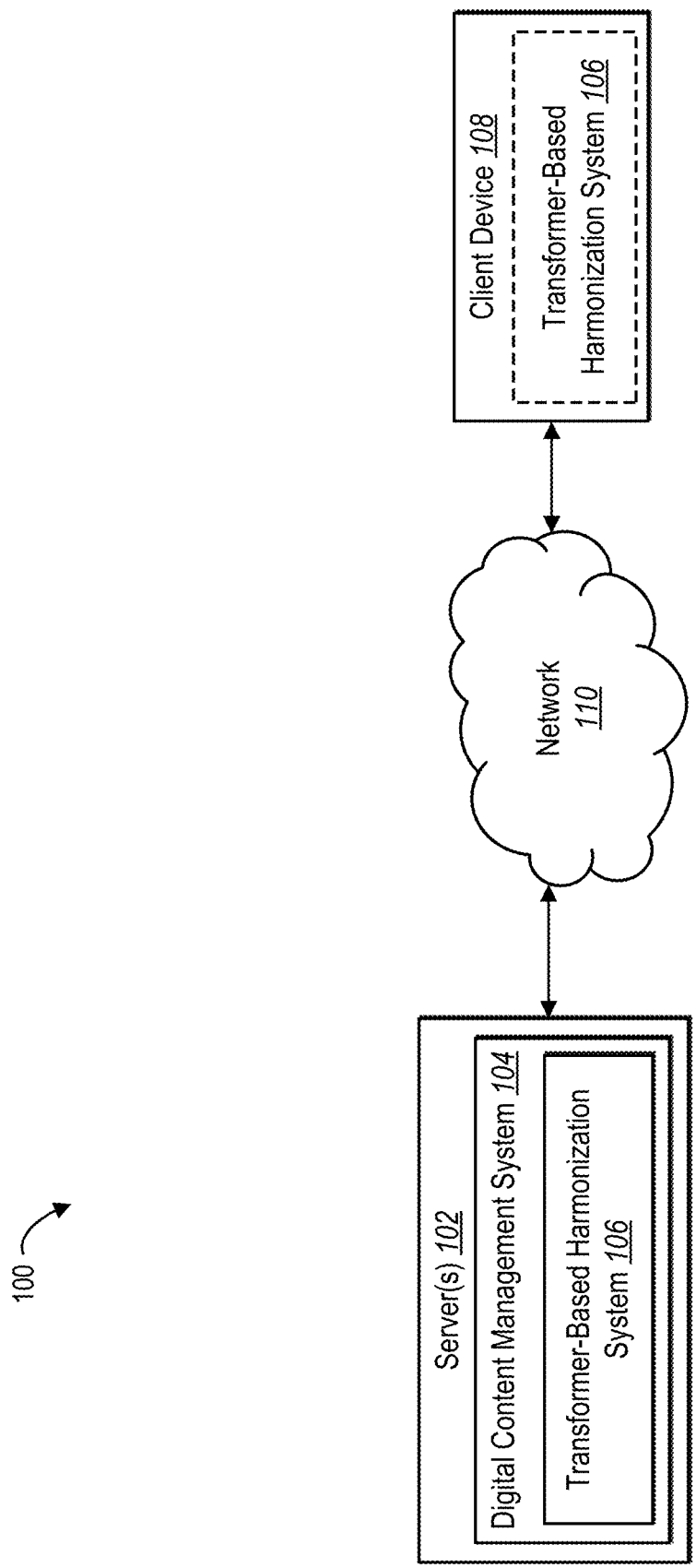
FIG. 1 illustrates a computing system environment for implementing a transformer-based harmonization system in accordance with one or more embodiments.

One or more embodiments herein include a transformer-based harmonization system that implements a two-branch architecture to harmonize composite images. For example, in one or more implementations, the transformer-based harmonization system uses a convolutional branch and a transformer branch to generate a harmonized composite image based on an input composite image and a corresponding segmentation mask. More particularly, the convolutional branch comprises a series of convolutional neural network layers to extract localized information from the input composite image. Additionally, in one or more embodiments, the convolutional branch comprises a style normalization layer to match low-level statistics between the background image and the composited foreground. Further, the transformer branch comprises a series of transformer neural network layers to extract global information (e.g., a global receptive field) based on different resolutions of the input composite image. Utilizing a decoder, the transformer-based harmonization system combines the local information and the global information from the corresponding convolutional branch and transformer branch to generate a harmonized composite image.

As just mentioned, in one or more embodiments, the transformer-based harmonization system efficiently and accurately generates a harmonized composite image based on an input composite image and a segmentation mask. The composite image comprises a combination of a background image and a foreground object (cut out from a different image)—often forming a disharmonious or unrealistic combination. Additionally, the segmentation mask comprises a guide mask or binary pixel mapping that defines the metes and bounds of the foreground object (e.g., the image region to be harmonized).

Based on the input composite image and the segmentation mask, the transformer-based harmonization system uses a convolutional branch to extract local contextual information from the composite image. For example, the transformer-based harmonization system uses convolutional neural network layers of the convolutional branch to determine background characteristics near the foreground object for adjusting the foreground light accordingly (e.g., for appearance compatibility). To illustrate, the transformer-based harmonization system 106 uses convolutional neural network layers to extract local color information around the composited foreground object. In addition, the transformer-based harmonization system uses the convolutional branch to preserve structure and semantics of the composite image.

Furthermore, the transformer-based harmonization system uses the convolutional branch to inject style information from the background into the foreground object. In particular, the convolutional branch comprises a style normalization layer that uses low-level statistics (e.g., mean and variance) of the background for correspondingly adjusting the foreground object. Moreover, the style normalization layer comprises learned style parameters for performing such foreground adjustment operations.

In addition, the transformer-based harmonization system leverages a transformation branch for extracting global contextual information from the composite image. For example, the transformer-based harmonization system uses transformer neural network layers that leverage both local attention and global attention for improved harmonization results. In particular, the transformer-based harmonization system uses transformer neural network layers that extract multi-level features of the composite image at different image resolutions (e.g., high-resolution coarse features and low-resolution fine features).

Further, the transformer-based harmonization system uses a decoder to merge the global information captured in the multi-level features from the transformer branch and the local, style-informed features from the convolutional branch. For example, the transformer-based harmonization system uses the decoder to apply the merged information in generating a harmonized composite image (e.g., in a same resolution as the input composite image). In certain implementations, the transformer-based harmonization system uses the decoder to render the harmonized composite image for display within a graphical user interface of a client device.

In certain implementations, the transformer-based harmonization system uses an iterative approach. For example, the transformer-based harmonization system uses the harmonized image as a next iteration input to the convolutional branch and transformer branch. In this manner, the transformer-based harmonization system achieves a desired progression of harmonization (e.g., from mild to aggressive) over multiple harmonization iterations.

In one or more embodiments, the transformer-based harmonization system trains the dual neural network branches as a single encoder (e.g., a harmonization neural network). For example, the transformer-based harmonization system uses the harmonization neural network to generate predicted harmonization images based on training composite images and training segmentation masks. The transformer-based harmonization system compares the predicted harmonization images and ground truth harmonization images utilizing a loss function. In particular embodiments, the transformer-based harmonization system uses the loss function to generate novel loss components—including a highlight loss, a mid-tone loss, and a shadow loss. In this manner, the transformer-based harmonization system trains the harmonization neural network to more accurately match the background (e.g., reference) region and the foreground region of a composite image.

As briefly mentioned above, a number of problems exist with conventional image compositing systems. For example, conventional image compositing systems approach image harmonization as predominantly (or only) a background harmonization problem. That is, conventional image compositing systems largely attempt to match the foreground characteristics with background information for localized areas around the composited foreground. This approach often leads to inaccurate image harmonization. For example, conventional image compositing systems are prone to performing erroneous image harmonization by matching the foreground appearance to local background areas, but not globally (or region to region) in the composite image.

In addition, conventional image compositing systems rigidly perform image harmonization. For instance, conventional image compositing systems use inflexible constraints or heuristics that do not allow aggressive, realistic harmonization between a composited foreground object and a background image with more extreme differences in characteristics. Similarly, conventional image compositing systems disallow subtle or mild harmonization—notwithstanding more extreme differences in characteristics. These limitations of conventional image compositing systems therefore hinder the computer functionality of implementing computing devices to variably control the magnitude and gradient of harmonization (as well as the digital creativity of associated users).

The transformer-based harmonization system addresses many of these technical drawbacks. For example, the transformer-based harmonization system improves an image harmonization accuracy by leveraging a dual-branched architecture for extracting localized context and global context from a composite image. Unlike conventional image compositing systems that focus solely on local context, the transformer-based harmonization system matches the foreground appearance according to both global and local information. The transformer-based harmonization system therefore generates harmonized images with increased realism and improved characteristic matching accuracy (e.g., more accurate pixel color, lighting, contrast, etc.).

In addition to improved harmonization quality and accuracy, the transformer-based harmonization system improves system flexibility of implementing computing devices. For example, the transformer-based harmonization system is not subject to inflexible constraints or heuristics like conventional image compositing systems. Rather, in certain embodiments, the transformer-based harmonization system provides an iterative approach for flexible, variable control over the magnitude and gradient of the harmonization. To illustrate, in one or more embodiments, the transformer-based harmonization system generates harmonized images with extreme change, subtle change, or myriad different intermediate levels of change to a foreground object. To do so, the transformer-based harmonization system feeds a harmonized image from a prior iteration as an input into the dual-branched architecture for a subsequent iteration. The transformer-based harmonization system can adjust the amount of harmonization per iteration and/or adjust the number of iterations to achieve the desired harmonization. This approach is therefore increasingly flexible and adaptive to user input or user intent.

As illustrated by the foregoing discussion, the present disclosure utilizes a variety of terms to describe features and benefits of the transformer-based harmonization system.

Additional detail is now provided regarding the meaning of these terms. For example, as used herein, a composite image refers to a digital image. In particular, a composite image includes a digital image generated from portions of two or more digital images. For example, a composite image comprises a foreground object (e.g., a person, scene, inanimate object, etc.) from a first digital image and background image (e.g., a scene or environment) from a second digital image that differs from the first digital image. In certain implementations, a composite image comprises a collage of multiple images, where each image corresponds to a separate layer. In other implementations, a composite image comprises a set of merged images (e.g., that form a panorama).

In addition, as used herein, the term "segmentation mask" refers to an identification of pixels in an image that represent an object. In particular embodiments, a segmentation mask includes an image filter useful for partitioning a digital image into separate portions. For example, a segmentation mask includes a filter that corresponds to a digital image (e.g., a foreground image) that identifies a portion of the digital image (i.e., pixels of the digital image) belonging to a foreground object and a portion of the digital image belonging to a background. Additionally or alternatively, a segmentation map refers to a pixel mapping of the digital image indicating whether a given pixel is (or is not) part of an object (e.g., foreground object). In such implementations, the indication can comprise a binary indication (e.g., a one ("1") for pixels belonging to the object and a zero ("0") for pixels not belonging to the object). In alternative implementations, the pixel mapping comprises probability values (e.g., a number between 1 and 0) that indicate the likelihood that a pixel belongs to the object. In such implementations, the closer the value is to 1, the more likely the pixel belongs to the foreground or object and vice versa.

Further, as used herein, the terms "neural network," "harmonization neural network," or "neural network branch" refer to one or more computing models that can be tuned (e.g., trained) based on inputs to approximate unknown functions. A neural network includes interconnected neurons arranged in layers that communicate and learn to approximate complex functions and generate outputs based on a plurality of inputs provided to the model. These layers can include a variety of parameters (e.g., layer weights that emphasize or de-emphasize features) that change during the learning process to improve neural network outputs and predictions. Accordingly, a neural network, harmonization neural network, or neural network branch can include deep convolutional neural networks ("CNNs"), fully convolutional neural networks ("FCNs"), or recurrent neural networks ("RNNs") such as long short-term memory neural networks ("LSTMs"). In other words, a neural network is an algorithm that implements deep learning techniques or machine learning that utilizes a set of algorithms to attempt to model high-level abstractions in data. More specifically, a harmonization neural network includes one or more such deep learning techniques or machine learning to perform image harmonization as disclosed herein.

As used herein, the term "convolutional neural network" refers to a particular type of neural network. In one or more embodiments, a convolutional neural network comprises convolutional neural network layers that extract local information from a composite image. Similarly, the term "transformer neural network" refers to another type of neural network. In some embodiments, a transformer neural network comprises one or more neural network layers for extracting global information from a composite image. In certain implementations, a transformer neural network comprises one or more self-attention neural network layers.

As used herein, the term "style normalization layer" refers to yet another type of neural network. In particular embodiments, a style normalization layer comprises learned parameters (e.g., style parameters) for adjusting image characteristics of a foreground object based on style information. Relatedly, as used herein, the term "style information" refers to an indication of a relationship of image characteristics from pixel-to-pixel or region-to-region in a composite image. In one or more embodiments, style information comprises statistical relationships of image characteristics (e.g., pixel information, metadata, etc.). For example, style information comprises a mean and standard deviation of pixel color values in a composite image. Myriad other image characteristics beyond pixel color values may be utilized.

Further, the term "local information" refers to image characteristics corresponding to an image portion adjacent to or surrounding a foreground object. In particular embodiments, local information comprises color or appearance related information for a region corresponding to an image portion adjacent to or surrounding a foreground object in a composite image. For example, local information comprises pixel color values (e.g., RGB color values), contrast values, highlight values, mid-tone values, shadow values, intensity values, saturation values, hue values, etc. It will be appreciated that local information for a localized area encompassing a foreground object includes image characteristics for myriad different-sized regions. Indeed, the size of a localized area is dependent on the size of the foreground object. In certain implementations, the localized area comprises a threshold number of pixels encompassing a foreground object, a pixel distance from a foreground object, an absolute distance from a foreground object, or other suitable metric measured relative to a foreground object.

In addition, the term "global information" refers to image characteristics corresponding to image portions outside or beyond a localized area encompassing a foreground object in a composite image. In particular embodiments, global information comprises color or appearance related information for image portions outside or beyond a localized area encompassing a foreground object in a composite image. For example, global information comprises pixel color values (e.g., RGB color values), contrast values, highlight values, mid-tone values, shadow values, intensity values, saturation values, hue values, etc.

As used herein, the term "decoder" refers to a computing model for generating (and in certain cases, rendering for display) a harmonized composite image. In particular embodiments, a decoder combines local information and global information to generate a harmonized composite image. To illustrate, a decoder merges feature vectors from a transformer neural network and a convolutional neural network. In addition, a decoder decodes the merged feature vectors to convert the merged feature vectors into a harmonized composite image.

Additional detail will now be provided in relation to illustrative figures portraying example embodiments and implementations of a transformer-based harmonization system. For example, FIG. 1 illustrates a computing system environment (or "environment") 100 for implementing a transformer-based harmonization system 106 in accordance with one or more embodiments. As shown in FIG. 1, the environment 100 includes server(s) 102, a client device 108, and a network 110. Each of the components of the environment 100 communicate (or are at least configured to communicate) via the network 110. Example networks are discussed in more detail below in relation to FIG. 10.

As further illustrated in FIG. 1, the environment 100 includes the server(s) 102. In some embodiments, the server(s) 102 comprises a content server and/or a data collection server. Additionally, or alternatively, the server(s) 102 comprise an application server, a communication server, a web-hosting server, a social networking server, or a digital content management server.

Moreover, as shown in FIG. 1, the server(s) 102 implement a digital content management system 104. In one or more embodiments, the digital content management system 104 generates, receives, edits, manages, and/or stores digital images (e.g., composite images). For example, in some instances, the digital content management system 104 accesses a composite image and transmits the composite image to at least one of the transformer-based harmonization system 106 or the client device 108. In other instances, the digital content management system 104 receives harmonized composite images for transmitting in one or more formats via the network 110, storing in cloud storage hosted on the server(s) 102, etc.

The transformer-based harmonization system 106 can efficiently and accurately generate a harmonized composite image. To do so, in one or more embodiments, the transformer-based harmonization system 106 leverages a first neural network to extract local information of a background portion around the foreground object and a second neural network to extract global information of a background. In particular, the transformer-based harmonization system 106 uses a decoder to generate a harmonized composite image based on the extracted local information and global information (as will be explained below in relation to subsequent figures).

As shown in FIG. 1, the environment 100 includes the client device 108. The client device 108 can include one of a variety of computing devices, including a smartphone, tablet, smart television, desktop computer, laptop computer, virtual reality device, augmented reality device, or other computing device as described in relation to FIG. 10. Although FIG. 1 illustrates a single client device 108, in some embodiments the environment 100 includes multiple client devices 108 (e.g., multiple mobile computing devices connected to each other via the network 110). Further, in some embodiments, the client device 108 receives user input (e.g., natural language commands) and provides information pertaining to accessing, viewing, modifying, generating, enhancing, and/or interacting with a composite image to the server(s) 102.

Moreover, as shown, the client device 108 optionally includes a version of the transformer-based harmonization system 106. In particular embodiments, the transformer-based harmonization system 106 on the client device 108 comprises a web application, a native application installed on the client device 108 (e.g., a mobile application, a desktop application, a plug-in application, etc.), or a cloud-based application where part of the functionality is performed by the server(s) 102. In some embodiments, the transformer-based harmonization system 106 on the client device 108 presents or displays information to a user associated with the client device 108, including harmonized digital images as provided in this disclosure.

In additional or alternative embodiments, the transformer-based harmonization system 106 on the client device 108 represents and/or provides the same or similar functionality as described herein in connection with the transformer-based harmonization system 106 on the server(s) 102. In some implementations, the transformer-based harmonization system 106 on the server(s) 102 supports the transformer-based harmonization system 106 on the client device 108.

For example, in some embodiments, the server(s) 102 train one or more neural networks described herein. The transformer-based harmonization system 106 on the server(s) 102 provides the one or more trained neural networks to the transformer-based harmonization system 106 on the client device 108 for implementation. In other words, the client device 108 obtains (e.g., downloads) the transformer-based harmonization system 106 from the server(s) 102. At this point, the client device 108 may utilize the transformer-based harmonization system 106 to generate harmonized images by performing the operations described herein independently from the server(s) 102.

In alternative embodiments, the transformer-based harmonization system 106 includes a web hosting application that allows the client device 108 to interact with content and services hosted on the server (s) 102. To illustrate, in one or more implementations, the client device 108 accesses a web page or computing application supported by the server (s) 102. The client device 108 provides input to the server(s) 102 to generate a harmonized composite image, and, in response, the transformer-based harmonization system 106 on the server (s) 102 performs operations described herein. The server(s) 102 then provides the output or results (e.g., a rendering of the harmonized image for display) to the client device 108.

In some embodiments, though not illustrated in FIG. 1, the environment 100 has a different arrangement of components and/or has a different number or set of components altogether. For example, in certain embodiments, the client device 108 communicates directly with the server(s) 102, bypassing the network 110. As another example, the environment 100 includes a third-party server comprising a content server and/or a data collection server.

Figure 2:
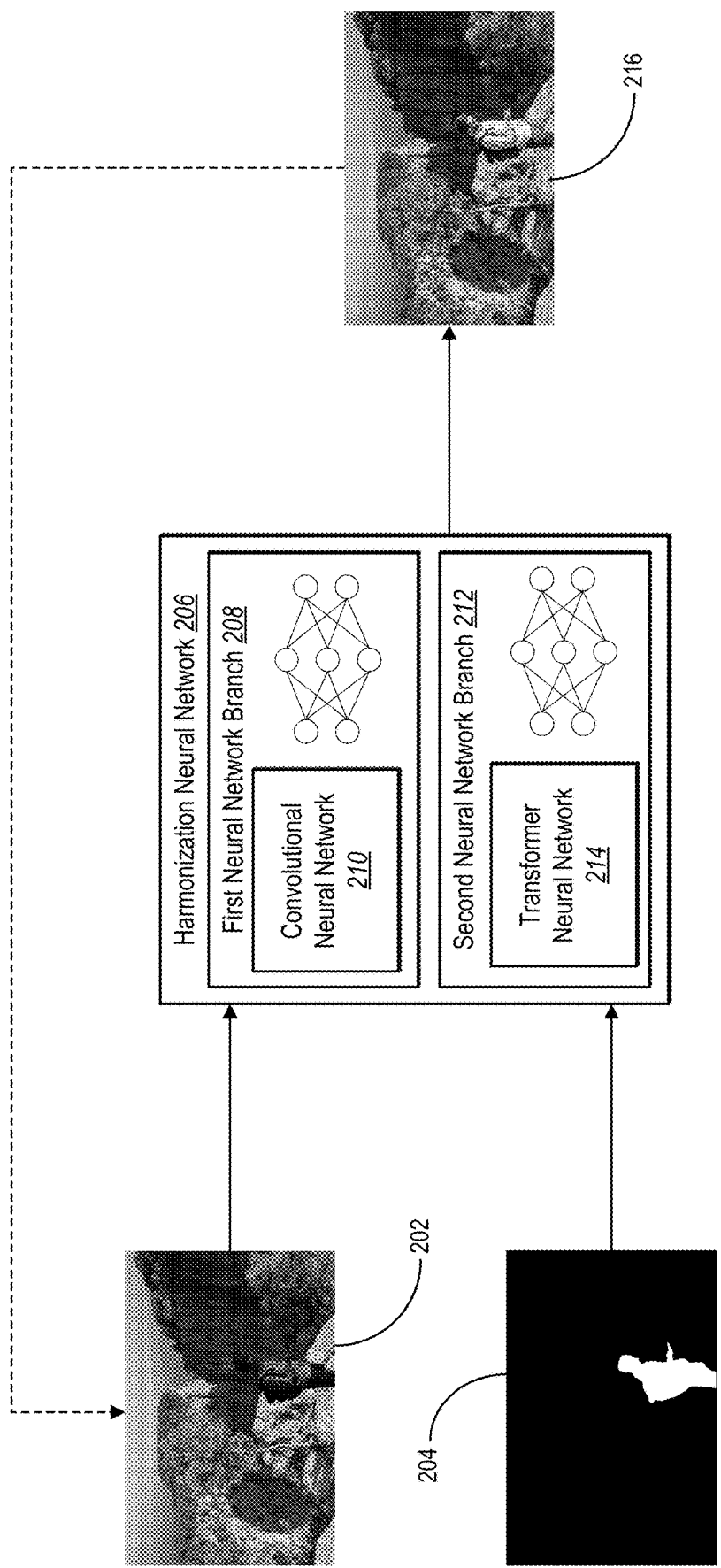
FIG. 2 illustrates a transformer-based harmonization system generating a harmonized composite image by using a dual-branched neural network architecture in accordance with one or more embodiments.

As mentioned above, the transformer-based harmonization system 106 efficiently and accurately generates a harmonized composite image. In accordance with one or more such embodiments, FIG. 2 illustrates the transformer-based harmonization system 106 generating a harmonized composite image by using a dual-branched neural network architecture. Indeed, as shown in FIG. 2, the transformer-based harmonization system 106 provides a composite image 202 and a segmentation mask 204 to a harmonization neural network 206.

The composite image 202 comprises a background image and a foreground object combined together. Unfortunately, like most composite images, the composite image 202 appears unrealistic due to visual disharmony between the composited foreground object (e.g., the portrayed person) and the background image. In this case, the visual disharmony corresponds to a distinct difference in lighting, contrast, or color between the composited foreground object and the background image. The segmentation mask 204 comprises a binary pixel mapping corresponding to the composite image 202. In particular, the segmentation mask 204 comprises a binary pixel mapping of the background and foreground regions of the composite image 202.

Based on the composite image 202 and the segmentation mask 204, the transformer-based harmonization system 106 uses the harmonization neural network 206 to generate a harmonized composite image 216. In particular embodiments, the transformer-based harmonization system 106 uses the harmonization neural network 206 to extract both local information and global information from the composite image 202. To do so, the transformer-based harmonization system 106 leverages the harmonization neural network 206 comprising a first neural network branch 208 and a second neural network branch 212.

In one or more embodiments, the first neural network branch 208 comprises a convolutional neural network 210. Utilizing the convolutional neural network 210, the transformer-based harmonization system 106 extracts local information from the composite image 202. For example, the transformer-based harmonization system 106 uses the convolutional neural network 210 to extract local color information around the foreground object.

Additionally, in one or more embodiments, the second neural network branch 212 comprises a transformer neural network 214. Utilizing the transformer neural network 214, the transformer-based harmonization system 106 extracts global information from the composite image 202. To illustrate, the transformer-based harmonization system 106 uses the transformer neural network 214 to extract color information from region-to-region across a background of the composite image 202 (including regions beyond a local area around the foreground object).

From the local information and the global information, the transformer-based harmonization system 106 generates the harmonized composite image 216. Indeed, as shown in FIG. 2, the harmonized composite image 216 comprises a background and foreground with matching, realistic image characteristics (e.g., color qualities, contrast, lighting conditions, etc.). In this manner, the transformer-based harmonization system 106 generates accurate harmonized composite images.

Moreover, in one or more embodiments, the transformer-based harmonization system 106 uses an iterative approach (as indicated by the dashed arrow from the harmonized composite image 216 back to the model inputs). Indeed, in one or more embodiments, the transformer-based harmonization system 106 iterates the foregoing approach by using the output of one iteration (e.g., the harmonized composite image 216) as the input for a next iteration. In this manner, the transformer-based harmonization system 106 can flexibly control how mild or aggressive to harmonize a foreground object and a background image.

Figure 3:
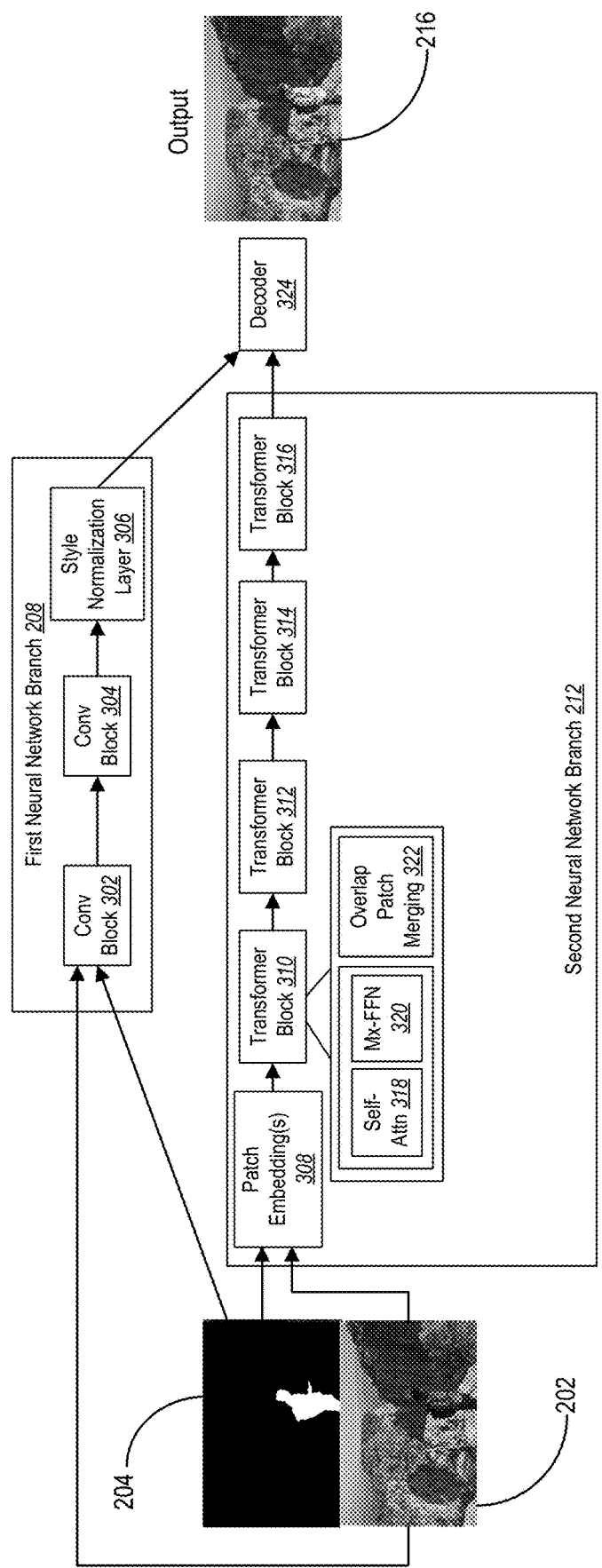
FIG. 3 illustrates a transformer-based harmonization system using a dual neural network branches to generate a harmonized composite image in accordance with one or more embodiments.

As discussed above, the transformer-based harmonization system 106 uses a dual-branched neural network architecture to intelligently harmonize composite images. In accordance with one or more embodiments, FIG. 3 illustrates the transformer-based harmonization system 106 using a particular architecture of neural network branches to generate a harmonized composite image. In particular, FIG. 3 illustrates additional detail of the harmonization neural network discussed above in relation to FIG. 2.

With respect to the model inputs, additional detail is also provided. For example, the composite image 202 (discussed above in relation to FIG. 2) comprises dimensions of H×W×C, where H indicates an image height, W indicates an image width, and C indicates a number of image color channels. In one or more embodiments, the segmentation mask 204 (also discussed above in relation to FIG. 2) comprises the same dimensions as the composite image 202.

It will be appreciated that the transformer-based harmonization system 106 receives or identifies the model inputs in one or more different ways. For example, in certain embodiments, the transformer-based harmonization system 106 identifies the composite image 202 in response to a user upload of a composite image (e.g., from memory of a client device and/or cloud storage or else live capture via a client device). In other examples, the transformer-based harmonization system 106 identifies the composite image 202 based on retrieving a composite image from an image library, a data store, or other repository of composite images.

Similarly, in one or more embodiments, the transformer-based harmonization system 106 identifies the segmentation mask 204 in response to a user upload. Additionally or alternatively, the transformer-based harmonization system 106 generates the segmentation mask 204 utilizing a segmentation neural network. For example, in certain implementations, the transformer-based harmonization system 106 implements a segmentation neural network comprising a computer algorithm that auto-generates segmentation masks. To illustrate, in one or more embodiments, the transformer-based harmonization system 106 implements a segmentation neural network comprising a salient object segmentation model—such as a portrait segmentation model. Alternatively, in one or more embodiments, the transformer-based harmonization system 106 generates the segmentation mask 204 based on one or more user inputs to define a segmentation (e.g., via a digital selection tool, lasso tool, cropping tool, etc.).

Further shown in FIG. 3, the transformer-based harmonization system 106 provides the composite image 202 and the segmentation mask 204 to the first neural network branch 208 (e.g., for local information extraction). In particular, the transformer-based harmonization system 106 uses convolutional neural network layers 302, 304 of the first neural network branch 208 to extract local information of the background adjacent to the composited foreground object. For example, the transformer-based harmonization system 106 uses the convolutional neural network layers 302, 304 to generate local background feature vectors that represent background information at a localized region of the background adjacent to the composited foreground object. In certain implementations, the local background feature vectors comprise encoded values (e.g., representative of color information, such as pixel color values). Additionally, in one or more embodiments, the local background feature vectors correspond to a spatial dimension of H/4×W/4.

Further, in certain embodiments, the transformer-based harmonization system 106 uses the convolutional neural network layers 302, 304 to generate local background feature vectors comprising style information corresponding to the background. For example, the local background feature vectors represent pixel-level statistics of certain image characteristics. To illustrate, the local background feature vectors represent a mean and standard deviation of pixel color values for pixels located around the composited foreground object (or elsewhere in the composite image 202).

In one or more embodiments, the first neural network branch 208 further comprises a style normalization layer 306. The transformer-based harmonization system 106 uses the style normalization layer 306 to inject style information from the background into the composited foreground object. To do so, the transformer-based harmonization system 106 provides, as inputs, the local background feature vectors and the segmentation mask 204 (e.g., of spatial dimensions H/4×W/4) to the style normalization layer 306.

If not previously determined using the convolutional neural network layers 302, 304, the transformer-based harmonization system 106 uses the style normalization layer 306 to extract style information from the background. For example, the transformer-based harmonization system 106 uses the segmentation mask 204 to identify the region to be harmonized (i.e., the composited foreground object). In turn, the transformer-based harmonization system 106 uses the style normalization layer 306 to determine pixel-level statistics of certain image characteristics of the background, the composited foreground object, or both. To illustrate, the transformer-based harmonization system 106 uses the style normalization layer 306 to determine a mean and standard deviation of pixel color values for pixels located around the composited foreground object. Additionally or alternatively, the transformer-based harmonization system 106 uses the style normalization layer 306 to determine a mean and standard deviation of pixel color values for pixels located in the background and pixels located in the foreground.

Based on the extracted style information, the transformer-based harmonization system 106 uses the style normalization layer 306 (e.g., an Instance Harmonization layer) to generate style-normalized foreground feature vectors for the composited foreground object. For example, the transformer-based harmonization system 106 provides the pixel-level statistics (e.g., the mean and standard deviation of pixel color values) as style parameters for the style normalization layer 306. The transformer-based harmonization system 106 causes the style normalization layer 306 to use these parameters for foreground adjustment operations. To illustrate, the transformer-based harmonization system 106 causes the style normalization layer 306 to modify (e.g., normalize) foreground feature vectors representing image characteristics of the composited foreground object based on the style parameters. Example operations to generate such style-normalized foreground feature vectors are further explained by Ling et al., Region-aware Adaptive Instance Normalization for Image Harmonization, In Proceedings of the IEEE/CVF Conference on Computer Vision and Pattern Recognition (2021), pages 9361-9370, the contents of which are expressly incorporated herein by reference.

Additionally shown in FIG. 3, the transformer-based harmonization system 106 provides the composite image 202 and the segmentation mask 204 to the second neural network branch 212. In the second neural network branch 212, the transformer-based harmonization system 106 leverages a transformer neural network to extract global information from a composite image.

Preparatory for the transformer neural network, the transformer-based harmonization system 106 performs one or more different operations. For example, the transformer-based harmonization system 106 divides the composite image 202 into image patches (e.g., of size 4 pixels×4 pixels, albeit different sized patches may be utilized). Additionally or alternatively, in certain embodiments, the transformer-based harmonization system 106 overlaps one or more of the image patches. Based on the image patches, the transformer-based harmonization system 106 generates patch embedding(s) 308. For example, the transformer-based harmonization system 106 generates the patch embedding(s) 308 by encoding image features or characteristics (e.g., pixel color values) associated with the image patches. It will be appreciated that the transformer-based harmonization system 106 can utilize one or more different encoders for generating the patch embedding(s) 308.

The transformer-based harmonization system 106 provides the patch embedding(s) 308 to the transformer neural network comprising transformer neural network layers 310-316. In particular embodiments, the transformer-based harmonization system 106 uses the transformer neural network layers 310-316 to generate multi-level feature vectors corresponding to the composite image 202 at a plurality of image resolutions (e.g., based on the patch embedding(s) 308). For instance, the transformer-based harmonization system 106 uses the transformer neural network layers 310-316 to generate multi-level feature vectors comprising high-resolution coarse features and low-resolution fine features from the patch embedding(s) 308. To illustrate, the transformer-based harmonization system 106 uses the transformer neural network layers 310-316 to generate multi-level feature vectors that capture patch-specific color information, contrast information, lighting condition information, etc. at fractional image resolutions (e.g., ¼, ⅛, 1/16, 1/32, etc.) of the original image resolution H×W of the composite image 202.

To generate the multi-level feature vectors as just described, the transformer-based harmonization system 106 implements one or more different architectures for the transformer neural network layers 310-316. In an example embodiment (shown in FIG. 3), the transformer neural network layers 310-316 comprise a self-attention neural network layer 318, a mix-FFN (feed forward network) 320, and an overlap patch merging operation 322.

The transformer-based harmonization system 106 uses the self-attention neural network layer 318 to intelligently weight image characteristics. For example, the transformer-based harmonization system 106 uses the self-attention neural network layer 318 to weight (e.g., emphasize or discount) image characteristics at certain regions or patches of the composite image 202. As another example, the transformer-based harmonization system 106 uses the self-attention neural network layer 318 to weight image characteristics based on their values. For instance, the transformer-based harmonization system 106 uses the self-attention neural network layer 318 to weight the highest pixel color values (e.g., highlight values) and the lowest pixel color values (e.g., shadow values) according to a predetermined or learned weighting scheme.

In addition, the transformer-based harmonization system 106 uses the mix-FFN 320 to factor in the effect of zero padding to leak location information. For example, the mix-FFN 320 comprises a 3×3 convolutional neural network layer to factor in the effect of zero padding to leak location information.

Further, the transformer-based harmonization system 106 causes the transformer neural network layers 310-316 to perform the overlap patch merging operation 322. The overlap patch merging operation 322 comprises one or more operations to merge features from the patch embedding(s) 308. For instance, the overlap patch merging operation 322 comprises combining encoded values from the patch embedding(s) 308 with modified encoded values generated by the self-attention neural network layer 318 and/or the mix-FFN 320. Additional or alternative operations are also herein contemplated.

The transformer-based harmonization system 106 uses a decoder 324 to generate the harmonized composite image 216 based on local information from the first neural network branch 208 and global information from the second neural network branch 212. For example, the transformer-based harmonization system 106 uses the decoder 324 to generate the harmonized composite image 216 based on the multi-level feature vectors from the second neural network branch 212 and the style-normalized foreground feature vectors from the first neural network branch 208. In particular embodiments, the decoder 324 comprises one or more transpose convolutional neural network layers to merge the multi-level feature vectors from the second neural network branch 212 and the style-normalized foreground feature vectors from the first neural network branch 208. In additional or alternative embodiments, the decoder 324 comprises a different architecture to decode the local information and the global information just described.

Based on the decoding, the harmonized composite image 216 comprises one or more modifications relative to the composite image 202. For example, in one or more embodiments, the harmonized composite image 216 comprises the foreground object with modified pixel color values based on the decoding of the local information and the global information.

As mentioned above, the transformer-based harmonization system 106, in one or more embodiments, trains a machine-learning model to efficiently and accurately generate predicted harmonized composite images utilizing novel loss functions. In accordance with one or more such embodiments, FIG. 4 illustrates the transformer-based harmonization system 106 training the harmonization neural network 206 to generate predicted harmonized composite images.

Figure 4:
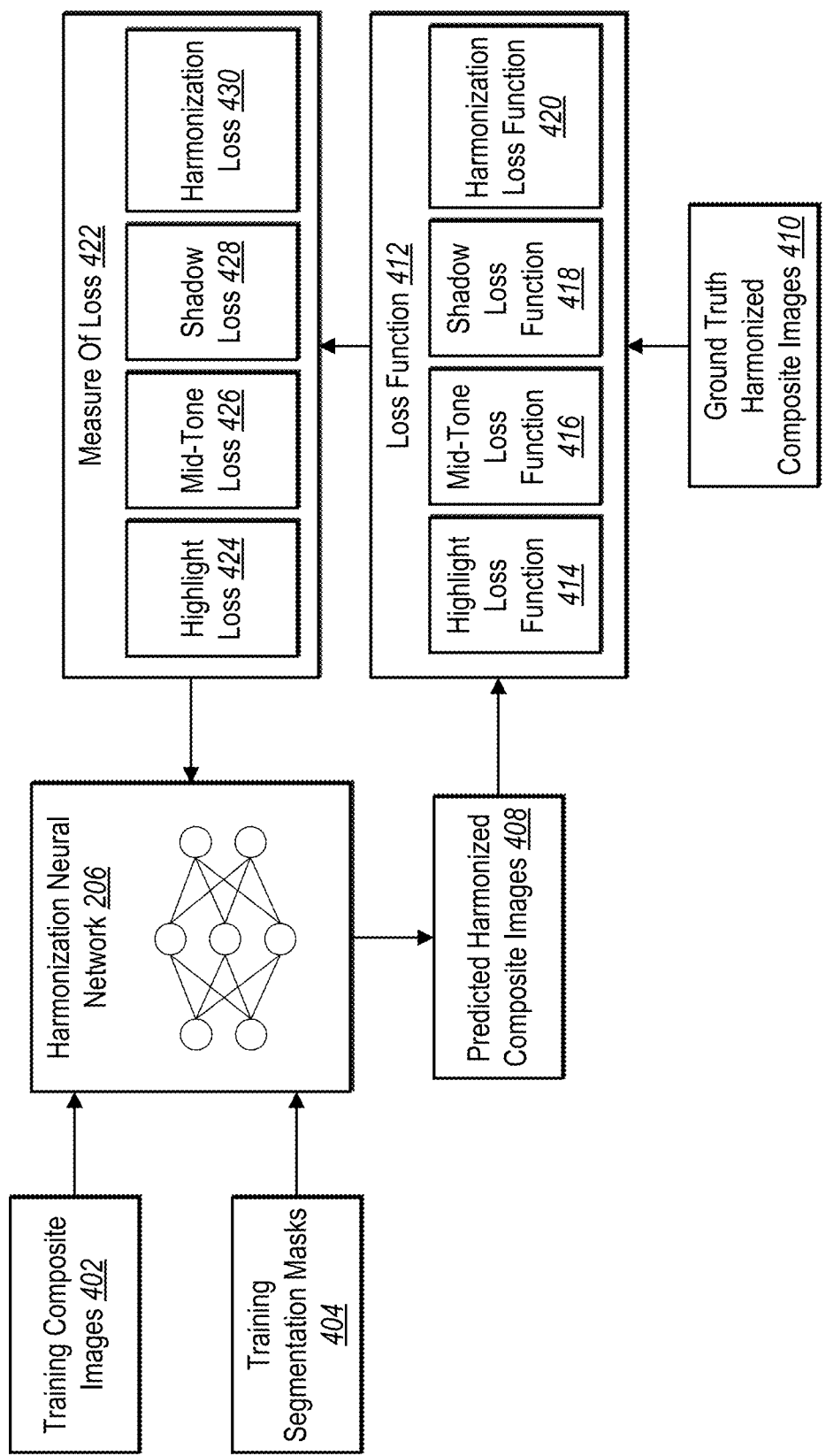
FIG. 4 illustrates a transformer-based harmonization system training a harmonization neural network to generate predicted harmonized composite images in accordance with one or more embodiments.

As shown in FIG. 4, the transformer-based harmonization system 106 generates training composite images 402 for providing to the harmonization neural network 206. In particular embodiments, the transformer-based harmonization system 106 generates the training composite images 402 by generating a synthetic dataset of digital images that comprise various background images and foreground objects. In certain implementations, the transformer-based harmonization system 106 generates the training composite images 402 using non-composite images and modifying (or perturbing) a foreground object to have different image characteristics than a background portion. Additionally or alternatively, the transformer-based harmonization system 106 generates the training composite images 402 by retrieving composite images from one or more databases (e.g., third-party servers).

In addition, the transformer-based harmonization system 106 generates training segmentation masks 404 for providing to the transformer-based harmonization system 106. In particular embodiments, the transformer-based harmonization system 106 generates the training segmentation masks 404 by segmenting foreground objects in the training composite images 402. For example, the transformer-based harmonization system 106 segments the foreground objects in the training composite images 402 utilizing a segmentation neural network. In other embodiments, the transformer-based harmonization system 106 retrieves the training segmentation masks 404 along with the training composite images 402 from one or more databases.

Based on the training composite images 402 and the training segmentation masks 404, the harmonization neural network 206 generates predicted harmonized composite images 408. The predicted harmonized composite images 408 comprise predicted foreground pixels that comprise color, lighting, or other appearance adjustments. In addition, the predicted harmonized composite images 408 comprise original background pixels from the training composite images 402.

In addition, the transformer-based harmonization system 106 uses ground truth harmonized composite images 410 for comparing to the predicted harmonized composite images 408. In one or more embodiments, the ground truth harmonized composite images 410 comprise annotations, labels, or other ground truth data. In other embodiments, the ground truth harmonized composite images 410 comprise the real, true, or perfected image characteristics of a foreground region harmonized with the background region. Still, in other embodiments, the ground truth harmonized composite images 410 comprise the unperturbed or unmodified form of a non-composite training image.

In particular embodiments, the transformer-based harmonization system 106 compares the predicted harmonized composite images 408 and the ground truth harmonized composite images 410 utilizing a loss function 412. The loss function 412 returns quantifiable data (e.g., a measure of loss 422) regarding the difference between a given predicted harmonized composite image from the predicted harmonized composite images 408 and a corresponding ground truth harmonized composite image from the ground truth harmonized composite images 410. In particular embodiments, the loss function 412 comprises a regression loss function (e.g., a mean square error function, a quadratic loss function, an L2 loss function, a mean absolute error/L1 loss function, mean bias error). Additionally, or alternatively, the loss function 412 includes a classification-type loss function (e.g., a hinge loss/multi-class SVM loss function, cross entropy loss/negative log likelihood function).

In particular embodiments, the loss function 412 includes novel loss functions comprising a highlight loss function 414, a mid-tone loss function 416, and a shadow loss function 418. In addition, the loss function 412 comprises a harmonization loss function 420. Utilizing these loss functions, the transformer-based harmonization system 106 can train the harmonization neural network 206 to intelligently learn to harmonize background and foreground regions. Each of these loss functions is described below.

The highlight loss function 414 comprises a loss function for generating a highlight loss 424. The highlight loss function 414 measures the difference between a predicted highlight value and a ground truth highlight value. A highlight value refers to the maximum pixel color value or brightest intensity value for pixels of an image. Therefore, the transformer-based harmonization system 106 uses the highlight loss function 414 as defined according to the L1 loss function (1) below:

$$\mathcal{L}_{highlight} = \|H_p - \hat{I}_p\|_1 \qquad (1)$$

where H represents the predicted value, $\hat{I}$ represents the ground truth value, and the subscript p=i(max(L(H))). The term i corresponds to the index location, L corresponds to the luminescence channel of the image, and max( ) represents the maximum function to obtain a maximum value.

The mid-tone loss function 416 comprises a loss function for generating a mid-tone loss 426. The mid-tone loss function 416 measures the difference between a predicted mid-tone value and a ground truth mid-tone value. A mid-tone value refers to the average pixel color value or average intensity value for pixels of an image. Therefore, the transformer-based harmonization system 106 uses the mid-tone loss function 416 as defined according to the L1 loss function (2) below:

$$\mathcal{L}_{mid\text{-}tone} = \|H_q - \hat{I}_q\|_1 \qquad (2)$$

where the subscript q=i(mean(L(H))). The term mean ( ) corresponds to the mean function to obtain a mean value.

The shadow loss function 418 comprises a loss function for generating a shadow loss 428. The shadow loss function 418 measures the difference between a predicted shadow value and a ground truth shadow value. A shadow value refers to the darkest pixel color value or lowest intensity value for pixels of an image. Therefore, the transformer-based harmonization system 106 uses the shadow loss function 418 as defined according to the L1 loss function (3) below:

$$\mathcal{L}_{shadow} = \|H_r - \hat{I}_r\|_1 \qquad (3)$$

where the subscript r=i(min(L(H))). The term min ( ) corresponds to the minimum function to obtain a minimum value.

In one or more embodiments, the transformer-based harmonization system 106 defines the combination of the highlight loss 424, the mid-tone loss 426, and the shadow loss 428 as the contrast loss. For example, the transformer-based harmonization system 106 defines the contrast loss by summing each of functions (1)-(3) according to function (4) below:

$$\mathcal{L}_{contrast} = \mathcal{L}_{highlight} + \mathcal{L}_{mid\text{-}tone} + \mathcal{L}_{shadow} \quad (4)$$

Additionally shown in FIG. 4, the loss function 412 comprises the harmonization loss function 420 to generate a harmonization loss 430. The transformer-based harmonization system 106 uses the harmonization loss function 420 to minimize the distance between the prediction and the ground truth. In one or more embodiments, the transformer-based harmonization system 106 defines the harmonization loss function 420 according to function (5) below:

$$\mathcal{L}_{harmonization} = \|H - \hat{H}\|_1 \quad (5)$$

Based on one or more of the losses for the measure of loss 422, the transformer-based harmonization system 106 updates one or more learned parameters for the harmonization neural network 206. In particular embodiments, the transformer-based harmonization system 106 adjusts various parameters to improve the quality/accuracy of the predicted harmonized composite images 408 in subsequent training iterations—by narrowing the difference between the predicted harmonized composite images 408 and the ground truth harmonized composite images 410 in subsequent training iterations.

As discussed above, in certain embodiments, the transformer-based harmonization system 106 receives a composite image and corresponding user inputs for image harmonization via a graphical user interface of a client device. In accordance with one or more such embodiments, FIGS. 5A-5B illustrate graphical user interfaces 502a-502b of a client device 500 for generating and displaying a harmonized composite image.

Figure 5A:
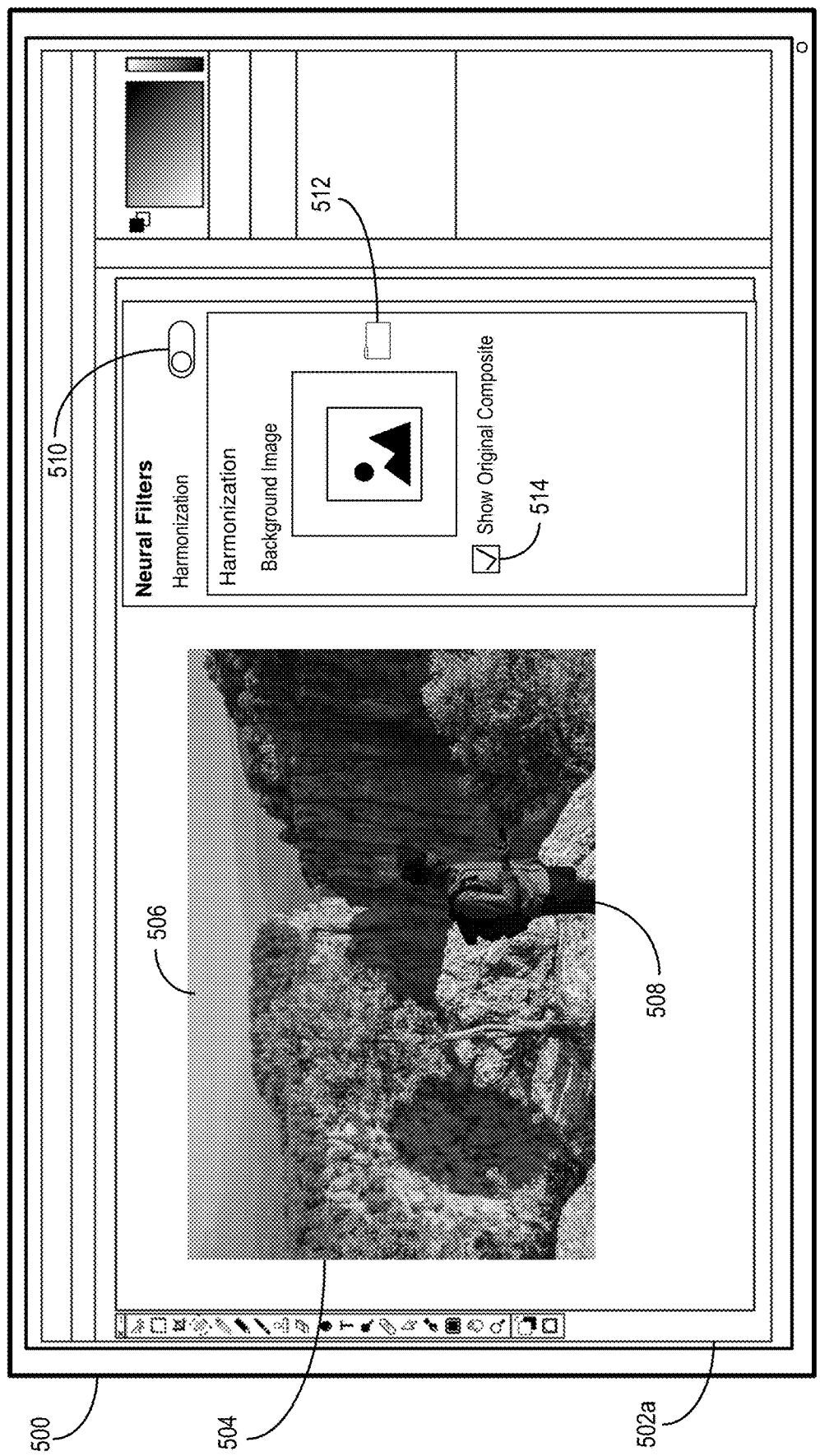
FIGS. 5A-5B illustrate graphical user interfaces of a client device for generating and displaying a harmonized composite image in accordance with one or more embodiments.
Figure 5B:
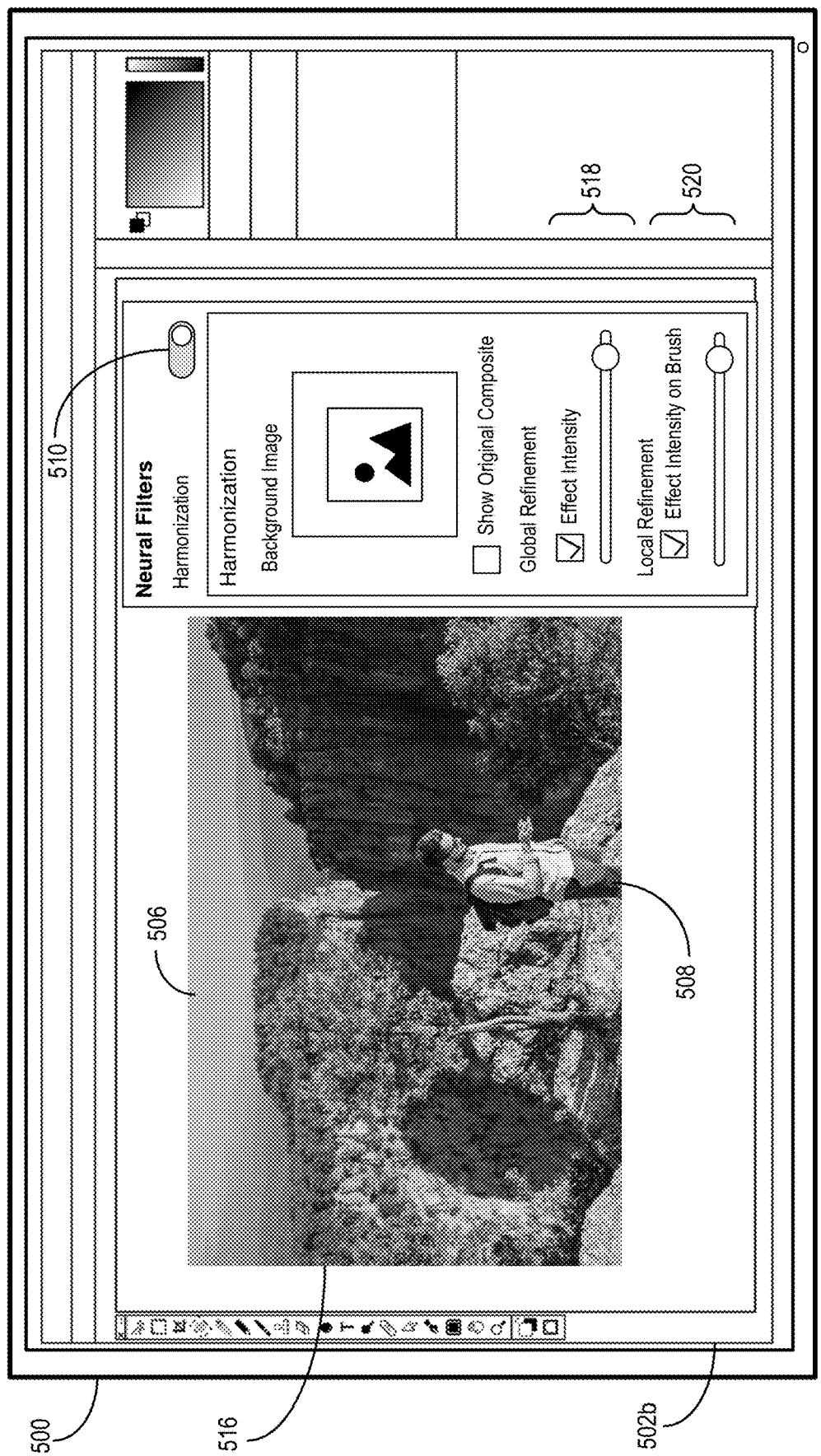

As shown in FIG. 5A, the transformer-based harmonization system 106 causes the client device 500 to instantiate the graphical user interface 502a for receiving a composite image 504. The transformer-based harmonization system 106 receives the composite image 504 in one or more different ways. In particular embodiments, the transformer-based harmonization system 106 receives the composite image 504 in a piece-meal approach. For example, the transformer-based harmonization system 106 identifies a user upload of a background image (e.g., of a background 506) in response to detecting a user input with a user upload icon 512. In another example, the transformer-based harmonization system 106 captures a digital image of content (e.g., a scene portraying the background 506) in a camera viewfinder of the client device 500.

In turn, the transformer-based harmonization system 106 causes the client device 500 to display the background 506 within the graphical user interface 502a. In one or more embodiments, the transformer-based harmonization system 106 layers the background 506 behind a foreground object 508. In other embodiments, the transformer-based harmonization system 106 retrieves the foreground object 508 in a same or similar manner as done for the background 506 (e.g., via user upload or live-image capture) to layer over the background 506.

Alternative to a piece-meal approach, the transformer-based harmonization system 106 receives the composite image 504 based on a single user upload. For example, the transformer-based harmonization system 106 receives the composite image 504 from one or more memory devices of the client device 500, from cloud storage, etc. that comprise a repository of composite images previously generated.

As shown in FIG. 5A, the composite image 504 (i.e., the original composite image per user control 514) comprises the background 506 and the foreground object 508. As apparent, the foreground object 508 does not visually match the background 506 of the composite image 504. Indeed, the foreground object 508 appears unrealistic and aesthetically disharmonious in view of the background 506.

To harmonize the composite image 504, the transformer-based harmonization system 106 provides a harmonization filter 510 for user selection in the graphical user interface 502a. In response to identifying a user selection (e.g., a tap or swipe to toggle on) the harmonization filter 510, the transformer-based harmonization system 106 performs a series of acts described in this disclosure to generate a harmonized composite image. These acts are briefly described below in relation to FIG. 5B.

As shown in FIG. 5B, the transformer-based harmonization system 106 causes the client device 500 to instantiate the user interface 502b comprising a harmonized composite image 516. The transformer-based harmonization system 106 does so in response to identifying a user input to turn on or activate the harmonization filter 510. Moreover, as just mentioned, the transformer-based harmonization system 106 performs a series of acts described in this disclosure to generate the harmonized composite image 516.

In one or more embodiments, the transformer-based harmonization system 106 utilizes a segmentation neural network to generate a segmentation mask of the foreground object 508 portrayed against the background 506 of the composite image 504. Additionally or alternatively, the transformer-based harmonization system 106 prompts, via the graphical user interface, a user input for providing a coarse user selection of the foreground object 508 (e.g., via positive/negative clicks, a digital lasso selection, etc.). In response to the user input, the transformer-based harmonization system 106 generate a segmentation mask of the foreground object 508.

With the digital inputs comprising the composite image 504 and the corresponding segmentation mask, the transformer-based harmonization system 106 provides these inputs to a first neural network branch and a second neural network branch. The transformer-based harmonization system 106 uses the first neural network branch to extract local information of a background portion of the background 506 adjacent to the foreground object 508. In one or more embodiments, the transformer-based harmonization system 106 further uses the first neural network branch to inject style information into the foreground object 508 based on style information of the background 506. In addition, the transformer-based harmonization system 106 uses the second neural network branch (e.g., a transformer neural network) to extract global information of the background 506. In turn, the transformer-based harmonization system 106 uses a decoder to decode the local information and the global information to generate the harmonized composite image 516.

The graphical user interface 502b further comprises effect controls 518-520 (albeit not required for image harmonization as disclosed herein). In one or more embodiments, the effect controls 518-520 modify or influence the harmonization process just described. For example, the effect control 518 corresponds to globally-informed harmonization. Accordingly, in one or more embodiments, the transformer-based harmonization system 106 modifies an intensity or aggressiveness of image harmonization based on global information from the second neural network branch in response to user adjustment of the effect control 518. Similarly, in one or more embodiments, the effect control 520 corresponds to locally-informed harmonization. Therefore, the transformer-based harmonization system 106 modifies an intensity or aggressiveness of image harmonization based on local information from the first neural network branch in response to user adjustment of the effect control 520.

Figure 6:
FIG. 6 illustrates experimental results of implementing a transformer-based harmonization system to iteratively generate harmonized composite images in accordance with one or more embodiments.

As discussed above, in one or more embodiments, the transformer-based harmonization system 106 implements an iterative approach to generating harmonized composite images with increased harmonization accuracy and/or user control. In accordance with one or more such embodiments, FIG. 6 illustrates experimental results of implementing the transformer-based harmonization system 106 to iteratively generate harmonized composite images. Indeed, as shown in FIG. 6, the transformer-based harmonization system 106 uses an input composite image 602 (and a corresponding segmentation mask not shown) to generate a harmonized composite image 604. In turn, the transformer-based harmonization system 106 uses the harmonized composite image 604 (and the segmentation mask not shown) to generate an additional harmonized composite image 606.

In one or more embodiments, the transformer-based harmonization system 106 performs this iterative approach for a predetermined number of iterations (e.g., three harmonization iterations). In alternative embodiments, the transformer-based harmonization system 106 performs this iterative approach until achieving a predetermined matching consistency between a background and a foreground object in a composited image (e.g., as measured by a mean and/or variance in pixel color values for the foreground and background). For instance, the transformer-based harmonization system 106 iteratively performs image harmonization as disclosed herein until the foreground object comprises image information within a threshold range (e.g., a +/− percentage or absolute value) of image information for the background.

It will be appreciated that in one or more embodiments the transformer-based harmonization system 106 does not cause a client device to display intermediate images. For example, in certain embodiments, the transformer-based harmonization system 106 causes a client device to display the additional harmonized composite image 606 but not the harmonized composite image 604.

Alternatively, in certain implementations, the transformer-based harmonization system 106 causes a client device to display intermediate results (e.g., for increased user control of the image harmonization process). For instance, in one or more embodiments, the transformer-based harmonization system 106 generates the harmonized composite image 604 and causes a client device to render the harmonized composite image 604. At that time, the transformer-based harmonization system 106 can respond to user inputs for adjusting a harmonization gradient (e.g., an intensity of a global effect and/or a local effect) in a subsequent harmonization iteration.

Figure 7:
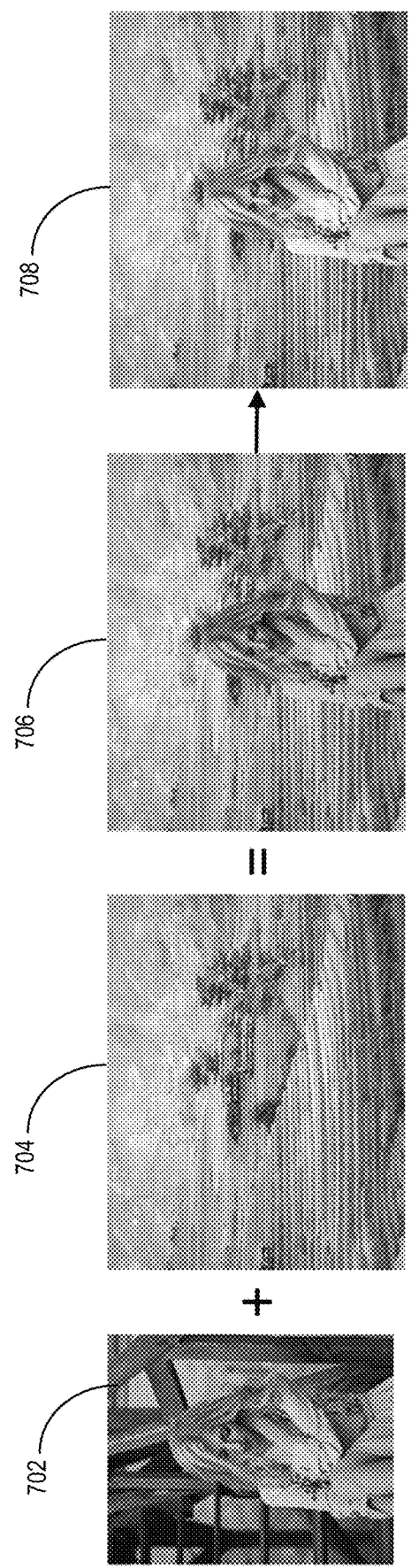
FIG. 7 illustrates additional experimental results of a transformer-based harmonization system generating a harmonized composite image in accordance with one or more embodiments.

As discussed above, the transformer-based harmonization system 106 efficiently and accurately generates harmonized composite images. In accordance with one or more embodiments, FIG. 7 illustrates additional experimental results of the transformer-based harmonization system 106 generating a harmonized composite image. Indeed, as shown in FIG. 7, the transformer-based harmonization system 106 generates a harmonized composite image 708 based on a composite image 706. Albeit not shown, the transformer-based harmonization system 106 generates the harmonized composite image 708 based on a segmentation mask for the composite image 706. In one or more embodiments, the segmentation mask identifies a foreground (i.e., the portrayed woman from an additional image 702) and a background 704. It will be appreciated that the transformer-based harmonization system 106 can similarly generate harmonized composite images for myriad different foregrounds and backgrounds.

Figure 8:
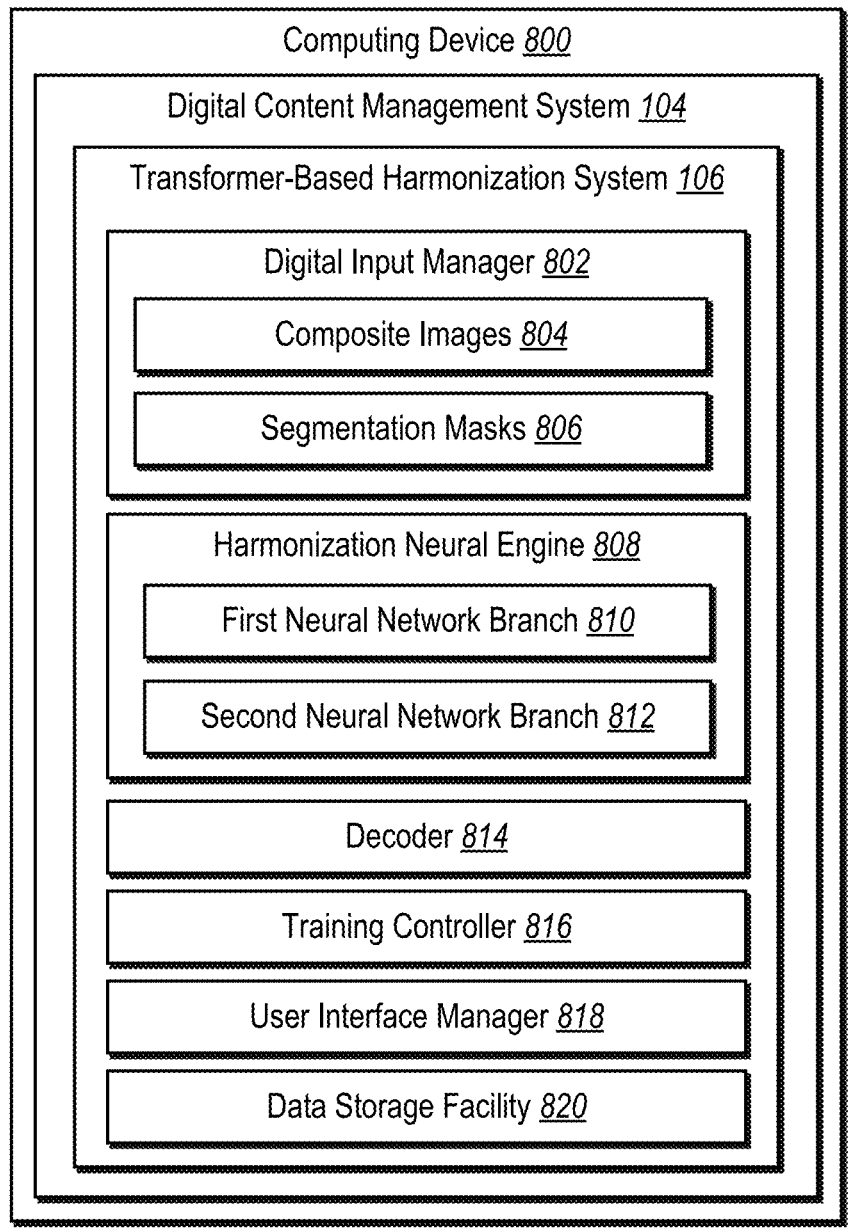
FIG. 8 illustrates a schematic diagram an example architecture of a transformer-based harmonization system in accordance with one or more embodiments.

Turning to FIG. 8, additional detail will now be provided regarding various components and capabilities of the transformer-based harmonization system 106. In particular, FIG. 8 illustrates an example schematic diagram of a computing device 800 (e.g., the server(s) 102 and/or the client device 108) implementing the transformer-based harmonization system 106 in accordance with one or more embodiments of the present disclosure. As shown, the transformer-based harmonization system 106 is implemented by the digital content management system 104. Also illustrated, the transformer-based harmonization system 106 includes a digital input manager 802, a harmonization neural engine 808, a decoder 814, a training controller 816, a user interface manager 818, and a data storage facility 820.

The digital input manager 802 can transmit, store, request, generate, and/or receive composite images 804 and segmentation masks 806 (as described in relation to the foregoing figures). For example, the digital input manager 802 receives the composite images 804 via user upload of composite images or by retrieving composite images from one or more repositories (e.g., datastores, third-party servers, etc.). In certain embodiments, the digital input manager 802 generates the segmentation masks 806 via a segmentation neural network.

The harmonization neural engine 808 (e.g., the harmonization neural network 206) extracts information from the composite images 804 and the segmentation masks 806 (as described in relation to the foregoing figures). In particular, the harmonization neural engine 808 comprises a first neural network branch 810 to extract local image information and a second neural network branch 812 to extract global image information. Utilizing the first neural network branch 810 and the second neural network branch 812, the harmonization neural engine 808 intelligently harmonizes composite images.

The decoder 814 decodes the local image information and the global image information to generate a harmonized composite image (as described in relation to the foregoing figures). In particular embodiments, the decoder 814 merges feature vectors from the first neural network branch 810 and the second neural network branch 812. Additionally, in one or more embodiments, the decoder 814 causes the user interface manager 818 to render a harmonized composite image based on merging feature vectors from the first neural network branch 810 and the second neural network branch 812.

The training controller 816 generates losses for updating one or more parameters of the harmonization neural engine 808 (as described in relation to the foregoing figures). In particular embodiments, the training controller 816 generates a highlight loss, a mid-tone loss, and a shadow loss as described above.

In one or more embodiments, the user interface manager 818 provides, manages, and/or controls a graphical user interface (or simply "user interface"). In particular embodiments, the user interface manager 818 generates and displays a user interface by way of a display screen composed of a plurality of graphical components, objects, and/or elements that allow a user to perform a function. For example, the user interface manager 818 receives user inputs from a user, such as a click/tap to upload or harmonize a composite image. Additionally, in one or more embodiments, the user interface manager 818 presents a variety of types of information, including text, harmonized composite images, or other information for presentation in a user interface.

The data storage facility 820 maintains data for the transformer-based harmonization system 106. The data storage facility 820 (e.g., via one or more memory devices) maintains data of any type, size, or kind, as necessary to perform the functions of the transformer-based harmonization system 106. For example, the data storage facility 820 stores one or more components of the digital input manager 802, the harmonization neural engine 808, or the decoder 814. As a particular example, the data storage facility 820 stores a composite image, a segmentation mask, a first neural network branch, a second neural network branch, and a decoder.

Each of the components of the computing device 800 can include software, hardware, or both. For example, the components of the computing device 800 can include one or more instructions stored on a computer-readable storage medium and executable by processors of one or more computing devices, such as a client device or server device. When executed by the one or more processors, the computer-executable instructions of the transformer-based harmonization system 106 can cause the computing device(s) (e.g., the computing device 800) to perform the methods described herein. Alternatively, the components of the computing device 800 can include hardware, such as a special-purpose processing device to perform a certain function or group of functions. Alternatively, the components of the computing device 800 can include a combination of computer-executable instructions and hardware.

Furthermore, the components of the computing device 800 may, for example, be implemented as one or more operating systems, as one or more stand-alone applications, as one or more modules of an application, as one or more plug-ins, as one or more library functions or functions that may be called by other applications, and/or as a cloud-computing model. Thus, the components of the computing device 800 may be implemented as a stand-alone application, such as a desktop or mobile application. Furthermore, the components of the computing device 800 may be implemented as one or more web-based applications hosted on a remote server.

The components of the computing device 800 may also be implemented in a suite of mobile device applications or "apps." To illustrate, the components of the computing device 800 may be implemented in an application, including but not limited to, ILLUSTRATOR®, LIGHTROOM®, PHOTOSHOP®, PHOTOSHOP® ELEMENTS, PHOTOSHOP® CAMERA, etc. Product names, including "ADOBE" and any other portion of one or more of the foregoing product names, may include registered trademarks or trademarks of Adobe Inc. in the United States and/or other countries.

Figure 9:
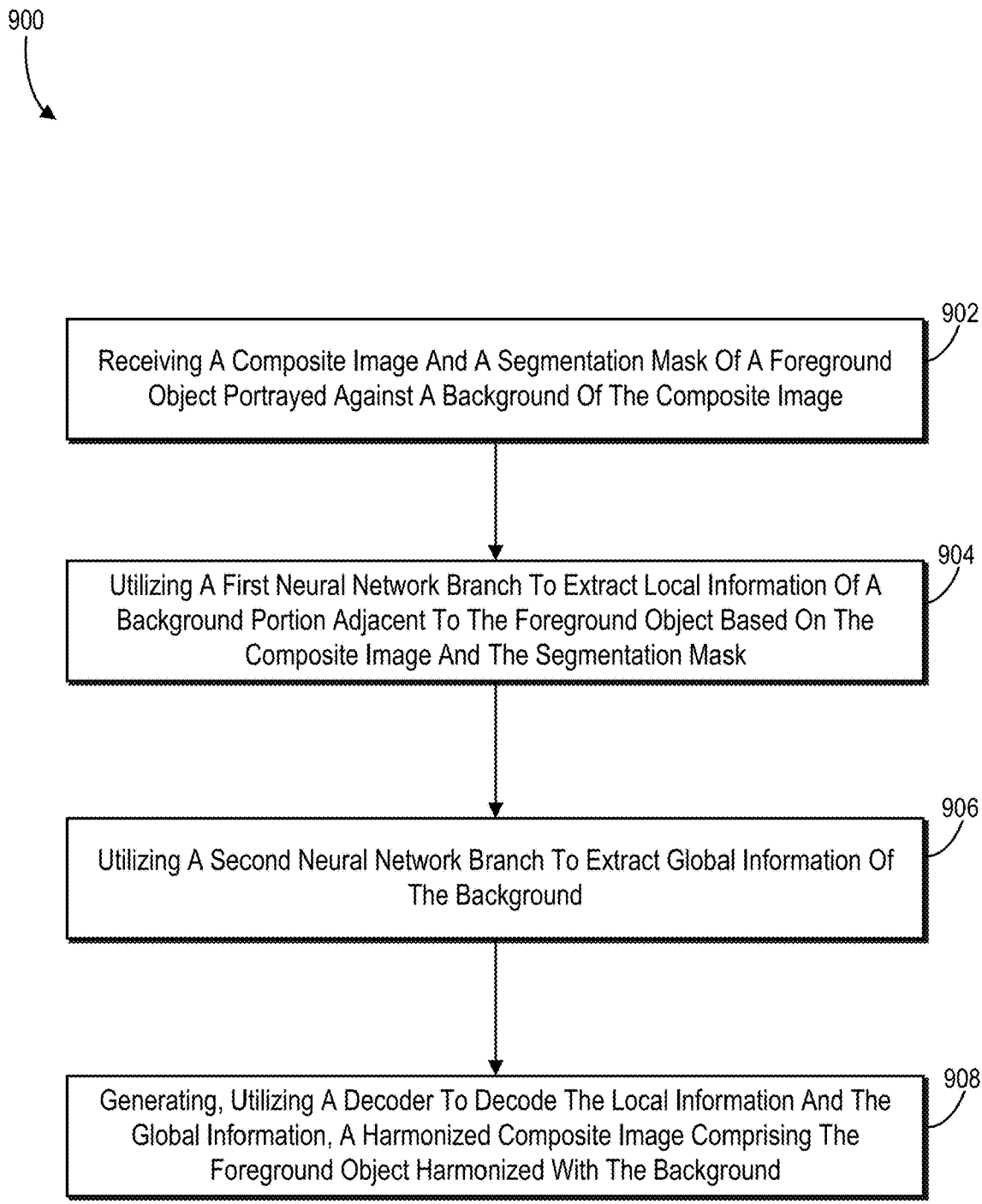
FIG. 9 illustrates a flowchart of a series of acts for generating a harmonized composite image in accordance with one or more embodiments.

FIGS. 1-8, the corresponding text, and the examples provide several different systems, methods, techniques, components, and/or devices of the transformer-based harmonization system 106 in accordance with one or more embodiments. In addition to the above description, one or more embodiments can also be described in terms of flowcharts including acts for accomplishing a particular result. For example, FIG. 9 illustrates a flowchart of a series of acts 900 for generating a harmonized composite image in accordance with one or more embodiments. The transformer-based harmonization system 106 may perform one or more acts of the series of acts 900 in addition to or alternatively to one or more acts described in conjunction with other figures. While FIG. 9 illustrates acts according to one embodiment, alternative embodiments may omit, add to, reorder, and/or modify any of the acts shown in FIG. 9. In one or more embodiments, the acts of FIG. 9 are performed as part of a method. Alternatively, a non-transitory computer-readable medium comprises instructions that, when executed by one or more processors, cause a computing device to perform the acts of FIG. 9. In some embodiments, a system is configured to perform the acts of FIG. 9.

As shown, the series of acts 900 includes act 902 of receiving a composite image and a segmentation mask of a foreground object portrayed against a background of the composite image. In certain embodiments, receiving the composite image and the segmentation mask comprises: identifying, via a graphical user interface, a user selection of a background image for combining with the foreground object as the composite image; identifying, via the graphical user interface, an additional user selection corresponding to a harmonization filter for harmonizing the foreground object and the background image; and utilizing a segmentation neural network to generate the segmentation mask of the foreground object portrayed against the background of the composite image.

The series of acts 900 also includes act 904 of utilizing a first neural network branch to extract local information of a background portion adjacent to the foreground object based on the composite image and the segmentation mask. In one or more embodiments, utilizing the first neural network branch comprises utilizing one or more convolutional neural network layers to extract the local information of the background portion adjacent to the foreground object. In certain embodiments, utilizing the first neural network branch comprises utilizing one or more style normalization layers to extract style information from the background portion adjacent to the foreground object by determining a mean and standard deviation of pixel color values between pixels corresponding to the background portion adjacent to the foreground object. In one or more embodiments, the first neural network branch comprises the style normalization layer to generate style-normalized foreground feature vectors for the foreground object based on style information for the background portion adjacent to the foreground object.

In addition, the series of acts 900 includes act 906 of utilizing a second neural network branch to extract global information of the background. In one or more embodiments, utilizing the second neural network branch comprises utilizing one or more transformer neural network layers to extract the global information of the background. In certain embodiments, utilizing the one or more transformer neural network layers to extract the global information of the background comprises utilizing one or more layers comprising a self-attention neural network layer, a mix feed-forward neural network layer, and an overlap patch merging layer.

In one or more embodiments, the second neural network branch comprises a series of transformer neural networks composed of at least one of a self-attention neural network layer, a mix feed-forward neural network layer, or an overlap patch merging layer. In some embodiments, the transformer neural network generates one or more multi-level feature vectors corresponding to the composite image at a plurality of image resolutions. Additionally or alternatively, in one or more embodiments, the transformer neural network generates the one or more multi-level feature vectors based on one or more patch embeddings for a plurality of patches dividing the composite image.

Further, the series of acts 900 includes act 908 of generating, utilizing a decoder to decode the local information and the global information, a harmonized composite image comprising the foreground object harmonized with the background. In certain embodiments, generating the harmonized composite image comprises utilizing the decoder to present, for display within a graphical user interface, the foreground object with modified pixel color values based on the decoding of the local information and the global information. In one or more embodiments, the decoder comprises a transpose convolutional layer to merge multi-level feature vectors from the second neural network branch and style-normalized foreground feature vectors from the first neural network branch.

It is understood that the outlined acts in the series of acts 900 are only provided as examples, and some of the acts may be optional, combined into fewer acts, or expanded into additional acts without detracting from the essence of the disclosed embodiments. Additionally, the acts described herein may be repeated or performed in parallel with one another or in parallel with different instances of the same or similar acts. As an example of an additional act not shown in FIG. 9, act(s) in the series of acts 900 may include act of utilizing the one or more style normalization layers to apply the style information to the foreground object.

As another example of an additional act not shown in FIG. 9, act(s) in the series of acts 900 may include act of: utilizing the first neural network branch to extract additional local information of the background portion adjacent to the foreground object based on the harmonized composite image and the segmentation mask; utilizing the second neural network branch to extract additional global information of the background; and generating, utilizing the decoder to decode the additional local information and the additional global information, an additional harmonized composite image comprising the foreground object further harmonized with the background.

As a further example of an additional act not shown in FIG. 9, act(s) in the series of acts 900 may include act of causing a system to generate a harmonized composite image comprising the foreground object with modified pixel color values based on the decoding of the local information and the global information, wherein the system comprises: a composite image comprising a foreground object portrayed against a background of the composite image; a segmentation mask of the foreground object; a first neural network branch to extract local information of a background portion adjacent to the foreground object based on the composite image and the segmentation mask, the first neural network branch comprising a convolutional neural network layer and a style normalization layer; a second neural network branch to extract global information of the background, the second neural network branch comprising a transformer neural network; and a decoder to decode the local information and the global information.

In still another example of an additional act not shown in FIG. 9, act(s) in the series of acts 900 may include act of: generating a measure of loss by comparing the harmonized composite image and a ground truth harmonized composite image utilizing a loss function; and updating one or more learned parameters for the first neural network branch and the second neural network branch based on the measure of loss.

Additionally, another example of an additional act not shown in FIG. 9 includes act(s) in the series of acts 900 of generating the measure of loss utilizing the loss function by: utilizing a highlight loss function to generate a highlight loss corresponding to a difference in brightest pixels of the harmonized composite image and the ground truth harmonized composite image; utilizing a mid-tone loss function to generate a mid-tone loss corresponding to a difference in pixel mid-tones of the harmonized composite image and the ground truth harmonized composite image; and utilizing a shadow loss function to generate a shadow loss corresponding to a difference in darkest pixels of the harmonized composite image and the ground truth harmonized composite image In another example of an additional act not shown in FIG. 9, act(s) in the series of acts 900 may include act of: receiving a composite image and a segmentation mask of a foreground object portrayed against a background of the composite image; utilizing a first neural network branch to extract local information of a background portion adjacent to the foreground object based on the composite image and the segmentation mask; utilizing a second neural network branch to extract global information of the background; generating, utilizing a decoder to decode the local information and the global information, a harmonized composite image comprising the foreground object harmonized with the background; and a step for determining a contrast loss and a harmonization loss based on the harmonized composite image and a ground truth composite image, the contrast loss and the harmonization loss being utilized to update one or more parameters of the first neural network branch and the second neural network branch. In one or more embodiments, the contrast loss comprises a highlight loss, a mid-tone loss, and a shadow loss. Further, in some embodiments, wherein utilizing the second neural network branch comprises utilizing one or more self-attention neural network layers to generate a multi-level feature vector representing the global information at a plurality of image resolutions.

As just mentioned, in one or more embodiments, act(s) the series of acts 900 include a step for determining a contrast loss and a harmonization loss based on the harmonized composite image and a ground truth composite image, the contrast loss and the harmonization loss being utilized to update one or more parameters of the first neural network branch and the second neural network branch. For instance, the acts and algorithms described above in relation to FIG. 4 can comprise the corresponding acts (or structure) for a step for determining a contrast loss and a harmonization loss based on the harmonized composite image and a ground truth composite image, the contrast loss and the harmonization loss being utilized to update one or more parameters of the first neural network branch and the second neural network branch.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
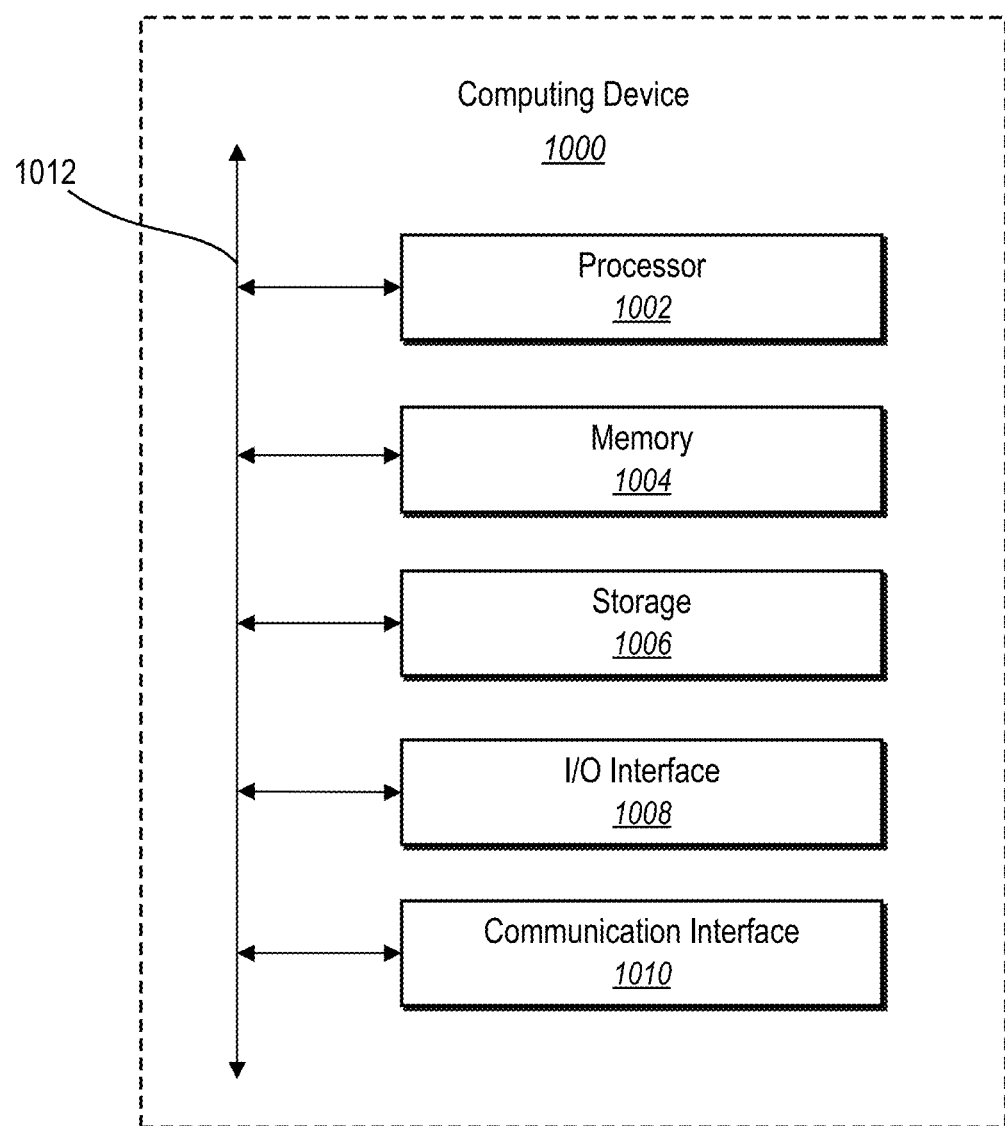
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 102, the client device 108, and/or the computing device 1000). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of the computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to perform operations comprising:
   receiving a composite image and a segmentation mask of a foreground object portrayed against a background of the composite image;
   utilizing a first neural network branch to extract local information of a background portion adjacent to the foreground object based on the composite image and the segmentation mask;
   utilizing a second neural network branch to extract global information of the background; and
   generating, utilizing a decoder to decode the local information and the global information, a harmonized composite image comprising the foreground object harmonized with the background.

2. The non-transitory computer-readable medium of claim 1, wherein utilizing the second neural network branch comprises utilizing one or more transformer neural network layers to extract the global information of the background.

3. The non-transitory computer-readable medium of claim 2, wherein utilizing the one or more transformer neural network layers to extract the global information of the background comprises utilizing one or more layers comprising a self-attention neural network layer, a mix feed-forward neural network layer, and an overlap patch merging layer.

4. The non-transitory computer-readable medium of claim 1, wherein utilizing the first neural network branch comprises utilizing one or more convolutional neural network layers to extract the local information of the background portion adjacent to the foreground object.

5. The non-transitory computer-readable medium of claim 1, wherein utilizing the first neural network branch comprises utilizing one or more style normalization layers to extract style information from the background portion adjacent to the foreground object by determining a mean and standard deviation of pixel color values between pixels corresponding to the background portion adjacent to the foreground object.

6. The non-transitory computer-readable medium of claim 5, further comprising instructions that, when executed by the at least one processor, cause the computing device to perform operations comprising utilizing the one or more style normalization layers to apply the style information to the foreground object.

7. The non-transitory computer-readable medium of claim 1, further comprising instructions that, when executed by the at least one processor, cause the computing device to perform operations comprising:
utilizing the first neural network branch to extract additional local information of the background portion adjacent to the foreground object based on the harmonized composite image and the segmentation mask;
utilizing the second neural network branch to extract additional global information of the background; and
generating, utilizing the decoder to decode the additional local information and the additional global information, an additional harmonized composite image comprising the foreground object further harmonized with the background.

8. The non-transitory computer-readable medium of claim 1, wherein receiving the composite image and the segmentation mask comprises:
identifying, via a graphical user interface, a user selection of a background image for combining with the foreground object as the composite image;
identifying, via the graphical user interface, an additional user selection corresponding to a harmonization filter for harmonizing the foreground object and the background image; and
utilizing a segmentation neural network to generate the segmentation mask of the foreground object portrayed against the background of the composite image.

9. The non-transitory computer-readable medium of claim 1, wherein generating the harmonized composite image comprises utilizing the decoder to present, for display within a graphical user interface, the foreground object with modified pixel color values based on the decoding of the local information and the global information.

10. A system comprising:
a composite image comprising a foreground object portrayed against a background of the composite image;
a segmentation mask of the foreground object;
a first neural network branch to extract local information of a background portion adjacent to the foreground object based on the composite image and the segmentation mask, the first neural network branch comprising a convolutional neural network layer and a style normalization layer;
a second neural network branch to extract global information of the background, the second neural network branch comprising a transformer neural network;
a decoder to decode the local information and the global information; and
one or more processors configured to cause the system to generate a harmonized composite image comprising the foreground object with modified pixel color values based on the decoding of the local information and the global information.

11. The system of claim 10, wherein the second neural network branch comprises a series of transformer neural networks composed of at least one of a self-attention neural network layer, a mix feed-forward neural network layer, or an overlap patch merging layer.

12. The system of claim 10, wherein the transformer neural network generates one or more multi-level feature vectors corresponding to the composite image at a plurality of image resolutions.

13. The system of claim 12, wherein the transformer neural network generates the one or more multi-level feature vectors based on one or more patch embeddings for a plurality of patches dividing the composite image.

14. The system of claim 10, wherein the first neural network branch comprises the style normalization layer to generate style-normalized foreground feature vectors for the foreground object based on style information for the background portion adjacent to the foreground object.

15. The system of claim 10, wherein the decoder comprises a transpose convolutional layer to merge multi-level feature vectors from the second neural network branch and style-normalized foreground feature vectors from the first neural network branch.

16. The system of claim 10, wherein the one or more processors are configured to:
generate a measure of loss by comparing the harmonized composite image and a ground truth harmonized composite image utilizing a loss function; and
update one or more learned parameters for the first neural network branch and the second neural network branch based on the measure of loss.

17. The system of claim 16, wherein the one or more processors are configured to generate the measure of loss utilizing the loss function by:
utilizing a highlight loss function to generate a highlight loss corresponding to a difference in brightest pixels of the harmonized composite image and the ground truth harmonized composite image;
utilizing a mid-tone loss function to generate a mid-tone loss corresponding to a difference in pixel mid-tones of the harmonized composite image and the ground truth harmonized composite image; and
utilizing a shadow loss function to generate a shadow loss corresponding to a difference in darkest pixels of the harmonized composite image and the ground truth harmonized composite image.

18. A computer-implemented method comprising:
receiving a composite image and a segmentation mask of a foreground object portrayed against a background of the composite image;
utilizing a first neural network branch to extract local information of a background portion adjacent to the foreground object based on the composite image and the segmentation mask;
utilizing a second neural network branch to extract global information of the background;
generating, utilizing a decoder to decode the local information and the global information, a harmonized composite image comprising the foreground object harmonized with the background; and
a step for determining a contrast loss and a harmonization loss based on the harmonized composite image and a ground truth composite image, the contrast loss and the harmonization loss being utilized to update one or more parameters of the first neural network branch and the second neural network branch.

19. The computer-implemented method of claim 18, wherein the contrast loss comprises a highlight loss, a mid-tone loss, and a shadow loss.

20. The computer-implemented method of claim 18, wherein utilizing the second neural network branch comprises utilizing one or more self-attention neural network layers to generate a multi-level feature vector representing the global information at a plurality of image resolutions.

* * * * *